United States Patent
Lee et al.

(10) Patent No.: US 7,353,024 B2
(45) Date of Patent: Apr. 1, 2008

(54) APPARATUS, METHOD AND SYSTEM FOR MATCHING SUBSCRIBER STATES IN NETWORK IN WHICH PUBLIC LAND MOBILE NETWORK AND WIRED/WIRELESS PRIVATE NETWORK ARE INTERWORKED

(75) Inventors: Dong-Youl Lee, Suwon-shi (KR); Gui-Jung Lee, Yongin-shi (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 793 days.

(21) Appl. No.: 10/259,811

(22) Filed: Sep. 30, 2002

(65) Prior Publication Data

US 2003/0069013 A1  Apr. 10, 2003

(30) Foreign Application Priority Data

Sep. 28, 2001  (KR)  ............... 10-2001-0060674

(51) Int. Cl.
 *H04Q 7/20* (2006.01)
 *H04Q 7/00* (2006.01)
(52) U.S. Cl. ............ 455/433; 455/426; 455/422; 455/462; 455/463; 455/465; 455/435; 370/328
(58) Field of Classification Search ........ 455/426, 455/422, 462, 463, 465, 432.1, 433, 435, 455/445; 370/328
See application file for complete search history.

(56) References Cited

U.S. PATENT DOCUMENTS 4,742,352 A * 5/1988 Ishii .................. 340/7.44
5,440,613 A * 8/1995 Fuentes ............. 455/432.2
5,960,340 A * 9/1999 Fuentes .............. 455/417

(Continued)

OTHER PUBLICATIONS

Bur Goode, "*Voice Over Internet Protocol (VoIP)*", IEEE, vol. 90, No. 9, pp. 1495-1517, Sep. 2002.

(Continued)

*Primary Examiner*—Matthew Anderson
*Assistant Examiner*—Wen Huang
(74) *Attorney, Agent, or Firm*—Robert E. Bushnell, Esq.

(57) ABSTRACT

An apparatus, method and system for matching subscriber states in network in which public land mobile network and wired/wireless private network are interworked are disclosed. The system matches subscriber state information of the public network to subscriber state information of the private network by allowing the private network to transmit state information of a mobile station toward the public network, the mobile station being located in a public and private cell area. The method includes the steps of a) allowing the private network to check state of a mobile station located in a public and private cell area and transmit the subscriber state information associated with the mobile station toward the public network; and b) allowing the public network to receive the subscriber state information and update the state of the mobile station in a visitor location register. The step a) is carried out when the state of the mobile station is changed or when an incoming signal from the public network is directed to the mobile station, which is in a local-area call connection state.

28 Claims, 13 Drawing Sheets

U.S. PATENT DOCUMENTS

| | | | |
|---|---|---|---|
| 5,999,813 A * | 12/1999 | Lu et al. | 455/435.2 |
| 6,073,029 A * | 6/2000 | Smith et al. | 455/555 |
| 6,363,246 B1 * | 3/2002 | Williams et al. | 455/403 |
| 6,535,730 B1 * | 3/2003 | Chow et al. | 455/462 |
| 6,597,908 B1 * | 7/2003 | Yu | 455/424 |
| 6,687,243 B1 * | 2/2004 | Sayers et al. | 370/356 |
| 6,944,445 B2 * | 9/2005 | Lee | 455/417 |
| 6,970,719 B1 * | 11/2005 | McConnell et al. | 455/554.1 |
| 7,171,199 B1 * | 1/2007 | Rahman | 455/433 |
| 2002/0034938 A1 * | 3/2002 | In et al. | 455/433 |

OTHER PUBLICATIONS

U.S. Patent Application Serial No. -to be assigned- to Dong-Youl Lee et al., entitled *Apparatus, Method and System for Matching Subscriber States in Network in Which Public Land Mobile Network and Wired/Wireless Private Network are Interworked*, which is concurrently filed with this application.

* cited by examiner

| ESN | MIN | MS EXTENSION NUMBER | SUBSCRIBER NAME | MS STATE | ... |
|---|---|---|---|---|---|
|   |   |   |   |   |   |
|   |   |   |   |   |   |
|   |   |   |   |   |   |
|   |   |   |   |   |   |

FIG. 6

| message_header (50bytes) |
| message_length (2bytes) |
| msg_id (2bytes) |
| esn (4bytes) |
| sdu_tag |
| mobile_id (22bytes) |
| ... |

FIG. 7

APPARATUS, METHOD AND SYSTEM FOR MATCHING SUBSCRIBER STATES IN NETWORK IN WHICH PUBLIC LAND MOBILE NETWORK AND WIRED/WIRELESS PRIVATE NETWORK ARE INTERWORKED

CROSS REFERENCE TO RELATED APPLICATION

This application relates to a U.S. patent application which is concurrently submitted to the U.S. Patent & Trademark Office with this application, entitled APPARATUS, METHOD AND SYSTEM FOR MATCHING SUBSCRIBER STATES IN NETWORK IN WHICH PUBLIC LAND MOBILE NETWORK AND WIRED/WIRELESS PRIVATE NETWORK ARE INTERWORKED, and claims all benefits accruing under 35 U.S.C. §119 from an application entitled APPARATUS, METHOD AND SYSTEM FOR MATCHING SUBSCRIBER STATES IN NETWORK IN WHICH PUBLIC LAND MOBILE NETWORK AND WIRED/WIRELESS PRIVATE NETWORK ARE INTERWORKED earlier filed in the Korean Industrial Property Office on 28 Sep. 2001 and there duly assigned Serial No. 2001-60674. Each of the above-cited applications is incorporated herein by reference in its entirety.

CLAIM OF PRIORITY

This application makes reference to, incorporates the same herein, and claims all benefits accruing under 35 U.S.C. §119 from an application for APPARATUS, METHOD AND SYSTEM FOR MATCHING SUBSCRIBER STATES IN NETWORK IN WHICH PUBLIC LAND MOBILE NETWORK AND WIRED/WIRELESS PRIVATE NETWORK ARE INTERWORKED earlier filed in the Korean Industrial Property Office on 28 Sep. 2001 and there duly assigned Serial No. 2001-60674.

BACKGROUND OF THE INVENTION

1. Field of the Invention

The present invention relates to a mobile communication system interworked with a PLMN (Public Land Mobile Network) and a wired/wireless private network, and more particularly to an apparatus, method and system for matching subscriber states of a PLMN and subscriber states of a wired/wireless private network by informing the PLMN of the subscriber states associated with the wired/wireless private network in a mobile communication system.

2. Description of the Related Art

Because a public mobile communication network and a private (or local area) mobile communication network are individually implemented, it is difficult for the public and private networks to be interworked with each other. In other words, a conventional mobile communication system can provide either public mobile communication services or private mobile communication services. A subscriber of a mobile communication terminal registered in the public network cannot use the private mobile communication services. Similarly, a subscriber of a mobile communication terminal registered in the private network cannot use the public mobile communication services. Accordingly, a system, which can provide the subscriber of one mobile communication terminal with both the public and private mobile communication services, is seriously needed.

Copending Korean Patent Application Ser. No. 2000-028172 entitled "SYSTEM AND METHOD FOR PROVIDING PUBLIC/PRIVATE MOBILE COMMUNICATION SERVICE", filed in the Korean Industrial Property Office on May 24, 2000 by Samsung Electronics Co., Ltd. is disclosed as an example of a public and private mobile communication system, which can provide one mobile communication terminal with both public and private mobile communication services.

Hereinafter, an MS is a mobile station being a mobile communication terminal. An MSC, a BSC and a BTS denote a mobile switching center, a base station controller and a base station transceiver subsystem, respectively. A prefix "p" attached to "MS", "MSC", "BSC" or "BTS" means "private". For convenience, the prefix "p" is used to distinguish components of the private network from components of the public network.

Copending Korean Patent Application Ser. No. 2000-060831 entitled "APPARATUS AND METHOD FOR PERFORMING PACKET DATA COMMUNICATION IN LOCAL-AREA RADIO INTERNET", filed in the Korean Industrial Property Office on Sep. 28, 2000 by Samsung Electronics Co., Ltd. is disclosed as an example of enabling use of a local-area radio internet by applying a wired/wireless mobile communication system to a 3G ($3^{rd}$ generation) network.

As disclosed in Korean Patent Application Ser. No. 2000-060831, a paging signal is transmitted through a path of "MSC->BSC->BTS->MS" in a conventional PLMN rather than an interworking service system in which the public and private networks are interworked, and a paging response message generated by the MS is transmitted through a path of "MS->BTS->BSC->MSC" as a reverse path of the paging signal path.

On the other hand, a wired/wireless communication service system disclosed in Korean Patent Application Ser. No. 2000-060831 transmits a paging signal through a path of "MSC->BSC->pBSC->BTS->MS" and a paging response message generated by the MS for the public and private networks is transmitted through a path of "MS->BTS->pBSC->BSC->MSC" as a reverse path of the paging signal path. Here, the pBSC transparently transmits the paging signal where it is the public-network paging signal and therefore does not affect processing of incoming and outgoing paging signals from and to the public network in a terminal, which is located within a public and private cell area. Accordingly, the private network is compatible with the public network. Further, the BSC for the public network can be directly coupled to the BTS without the use of the pBSC. Where the paging signal from the private network is generated, the processing of the paging signal is controlled within the private network.

When a local-area MS located within the public and private cell area, communicates with another local-area terminal or another terminal through a PBX (another local-area terminal coupled to the PBX or another terminal coupled to a PSTN (Public Switched Telephone Network), which can be coupled to an office line of the PBX) in the wired/wireless mobile communication system, the public network generates a paging signal because the public network recognizes the fact that the corresponding terminal is in an idle state rather than the fact that the corresponding terminal is coupled to a local-area call, where the public network pages the local-area MS. However, when the terminal is coupled to the local-area call, it cannot give any response to the paging signal from the public network. Accordingly, the public network does not identify a current location of a corresponding MS and transmits a second paging signal. There is a problem in that this causes radio resources of the public network to be wasted and cannot enable a caller to exactly recognize a state of a called party. Here, the second paging signal means not only an increase of the number of paging times but also expansion of a paging zone. In other words, the number of BTSs within the paging zone when the second paging signal is transmitted can be increased more than that within the paging zone when a first paging signal is transmitted. Here, the paging zone is previously prescribed. Further, the paging performed in the public network can exceed a predetermined paging range corresponding to the public and private networks.

SUMMARY OF THE INVENTION

Therefore, the present invention has been made in view of the above and other problems, and it is an object of the present invention to provide an apparatus, method and system for transmitting state information of terminals located within a private network to a public network in a mobile communication system interworked with the public and private networks.

It is another object of the present invention to provide an apparatus, method and system for matching subscriber state information of a private network and subscriber state information of a public network by transmitting state information of terminals located within the private network to the public network in a mobile communication system interworked with the public and private networks.

It is another object of the present invention to provide an apparatus, method and system for matching subscriber state information of a private network and subscriber state information of a public network by transmitting state information of terminals located within the private network to the public network in a mobile communication system interworked with the public and private networks, when an incoming call from the public network is directed to a local-area mobile station, which is coupled to a local-area call.

It is yet another object of the present invention to provide an apparatus, method and system for matching subscriber state information of a private network and subscriber state information of a public network by transmitting changed state information to the public network, when state information of local-area mobile stations is changed in a mobile communication system interworked with the public and private networks.

In accordance with a first aspect of the present invention, the above and other objects can be accomplished by the provision of a mobile communication system interworked with a public land mobile network and a wired/wireless private network, characterized in that subscriber state information of the public network is matched to subscriber state information of the private network by allowing the private network to transmit state information of a mobile station toward the public network, the mobile station being located in a public and private cell area.

In accordance with a second aspect of the present invention, there is provided a method for matching subscriber state information of a public land mobile network and subscriber state information of a wired/wireless private network in a mobile communication system interworked with the public network and the private network, including the steps of: a) allowing the private network to check a state of a mobile station located in a public and private cell area and transmit the subscriber state information associated with the mobile station toward the public network; and b) allowing the public network to receive the subscriber state information and process a paging call signal associated with the mobile station.

In accordance with a third aspect of the present invention, there is provided a mobile communication system interworked with a public land mobile network and a wired/wireless private network, including: a first determiner for determining whether a call signal from the public network directed to a local-area mobile station of the private network is generated; a second determiner for determining whether the local-area mobile station communicates with another local-area terminal; and a paging response message generator for generating a paging response message instead of the local-area mobile station and transmitting the paging response message to the public network if the call signal from the public network directed to the local-area mobile station of the private network is generated and a local area mobile station communicates with other local-area terminals.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 6 is a view illustrating a structure of a table having state information of MSs (Mobile Stations) included in a visitor location register for a private network in accordance with the present invention;

FIG. 7 is a view illustrating a format of a paging response message in accordance with the present invention;

DETAILED DESCRIPTION OF THE PREFERRED EMBODIMENTS

Figure 1:
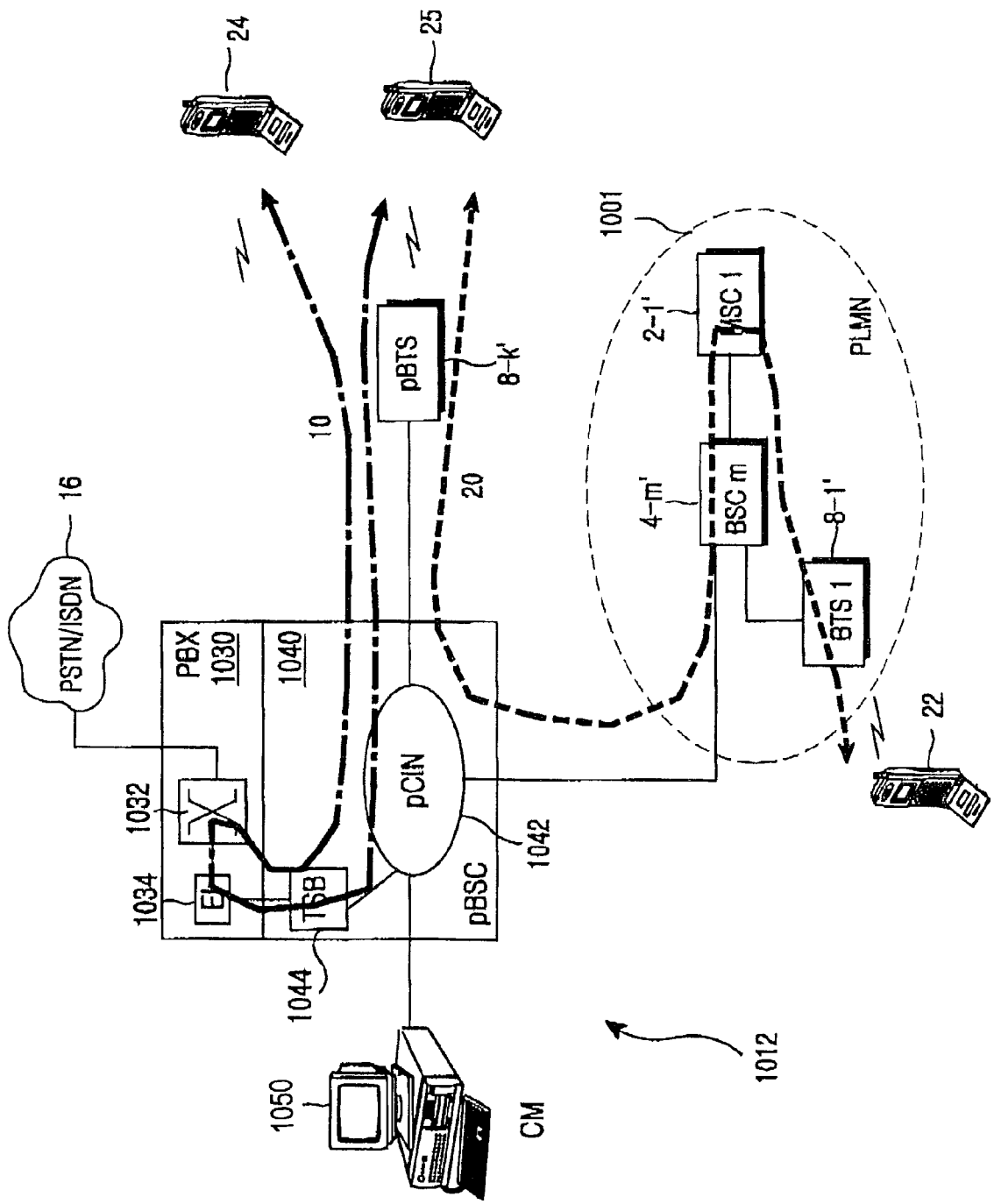
FIG. 1 is a view illustrating a configuration and its communication path associated with a public and private mobile communication system in which the present invention can be applied.

A schematic configuration and a communication path of a system shown in FIG. 1 will be described. FIG. 1 has certain features related to the disclosure in Korean Patent Application Ser. No. 2000-028172.

Referring to FIG. 1, a public and private communication service apparatus 1012 is made up of a PBX (Private Branched eXchange) 1030, a pBSC (private BSC) 1040 and a CM (Call Manager) 1050. The PBX 1030 includes a switch 1032 and an E1 (European subscriber line, a type of a dedicated circuit for transmitting data at a speed of 2.048 Mbps (Megabits per second) in a manner of the wide area digital transmitting technique) interface 1034, and the pBSC 1040 includes a pCIN (private Communication Interconnection Network) 1042 and a TSB (Transcoder & Selector Bank) 1044.

It should be understood that only internal configurations of the PBX 1030 and the pBSC 1040 as components necessary for explaining a communication path when the public and private mobile communication services are provided are shown in FIG. 1 and other components are omitted in FIG. 1. It is assumed that MSs 24 and 25 are registered in the public and private communication service apparatus 1012 so that the MSs 24 and 25 are located within a public and private cell area and can use the private mobile communication services. Further, it is assumed that an MS 22 is located within a public cell area. Under these assumptions, a communication path (that is, a traffic channel) 10 made up of the MS 24, a pBTS 8-k', the pCIN 1042 of the pBSC 1040, the TSB 1044, an E1 interface 1034, the switch 1032, the TSB 1044, the pCIN 1042, the pBTS 8-k' and the MS 25, and a reverse communication path of the communication path 10 are examples of the case where the private mobile communication services are provided. Further, a communication path (that is, a traffic channel) 20 made up of the MS 25, the pBTS 8-k', the pCIN 1042 of the pBSC 1040, a BSC 4-m' of a PLMN 1001, an MSC 2-l', the BSC 4-m', the BTS 8-l' and the MS 22, and a reverse communication path of the communication path 20 are examples of the case where the public mobile communication services are provided. The CM 1050 being a main controller of the public and private communication service apparatus 1012 controls the formation of the communication paths for the mobile communication services. The public and private communication service apparatus 1012 provides wired communication services, IP (Internet Protocol) terminal communication services and the public and private mobile communication services. The PBX 1030 supports the wired communication services and a gatekeeper (not shown) based on a VoIP (Voice over Internet Protocol) supports the IP terminal communication services. The CM 1050 controls the public and private mobile communication services, that is, radio call services.

Now, preferred embodiments of the present invention will be described in detail with reference to the annexed drawings. In the drawings, the same or similar elements are denoted by the same reference numerals even though they are depicted in different drawings. In the following description made in conjunction with preferred embodiments of the present invention, a variety of specific elements such as concrete circuits are shown. The description of such elements has been made only for a better understanding of the present invention. Those skilled in the art will appreciate that the present invention can be implemented without using the above-mentioned specific elements. Also, in the following description, a detailed description of known functions and configurations incorporated herein will be omitted when it may make the subject matter of the present invention rather unclear.

Figure 2:
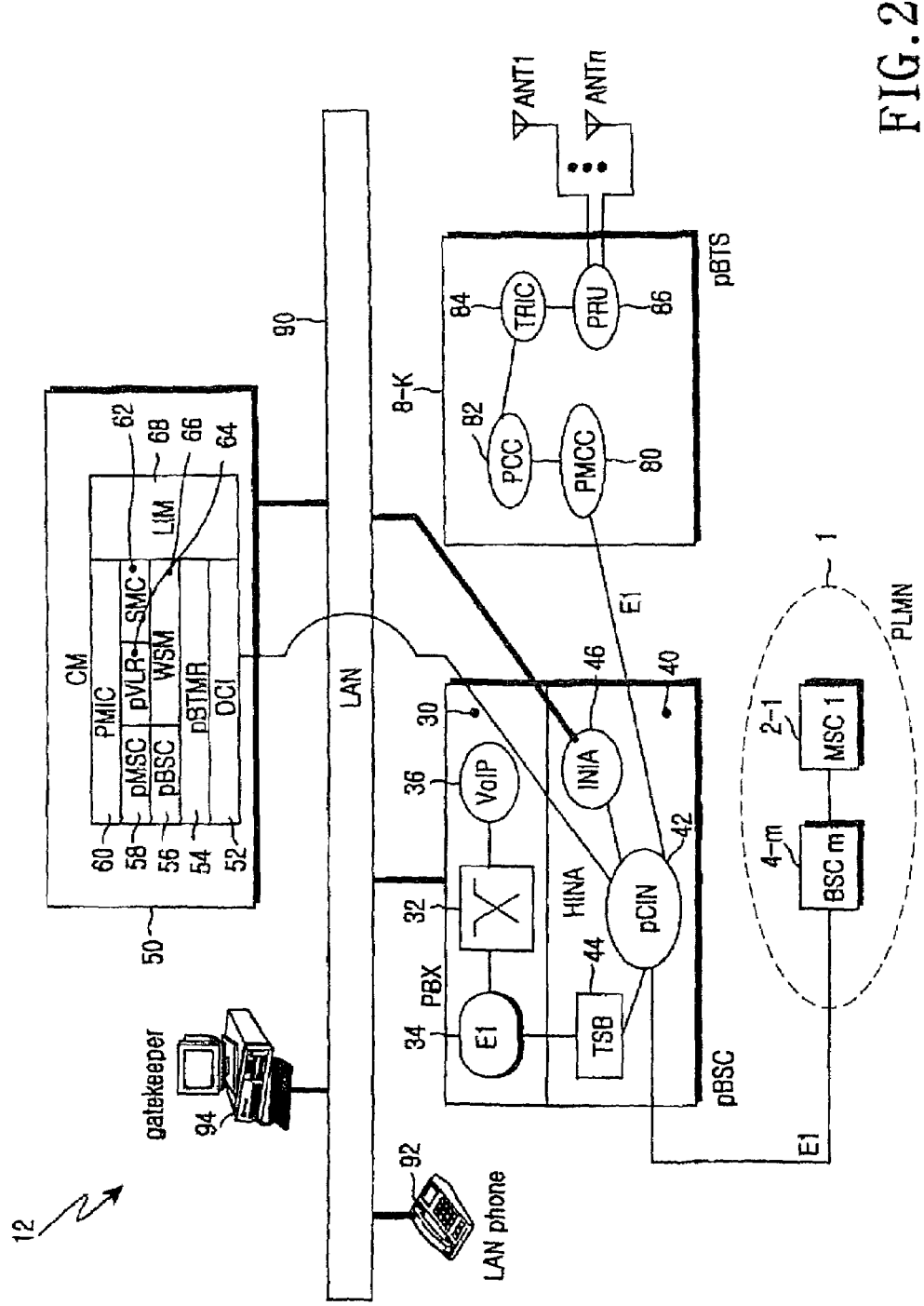
FIG. 2 is an exemplary view illustrating a configuration of a public and private communication service apparatus associated with a public and private mobile communication system in which the present invention can be applied.

FIG. 2 is an exemplary view illustrating a configuration of a public and private communication service apparatus associated with a public and private mobile communication system in which the present invention can be applied.

In accordance with an embodiment of the present invention, the public and private communication service apparatus 12 shown in FIG. 1 provides wired communication services, IP terminal communication services and public and private mobile communication services. As shown in FIG. 2, a PBX 30 supports the wired communication services and a gatekeeper 94 supports the IP terminal communication services. A CM 50 controls the public and private mobile communication services, that is, radio call services.

The PBX 30, an INIA (IP Network Interface board Assembly module) 46 included in a pBSC 40 and an LIM (LAN Interface Module) 68 included in the CM 50 are coupled to a LAN 90. The gatekeeper 94 is further coupled to the LAN 90. IP terminals such as a LAN-phone 92, a web-phone and a PC (Personal Computer) are coupled to the LAN 90.

The pBSC 40 performs a radio link control function, a handoff function, etc. corresponding to a BSC included in a public mobile communication system. A main controller of the pBSC 40 can be embedded as a software module in the CM 50. The pBSC 40 includes a pCIN 42. The pCIN 42 provides communication paths coupled to the CM 50, a BSC 4-m included in a PLMN 1 and a pBTS 8-k, and a data path among components included in the pBSC 40. In other words, the pCIN 42 analyzes a message type, a caller address and a destination address contained in a received message and then transmits a result of the analysis to a corresponding device or processor. An E1 line is coupled between the pCIN 42 and the BSC 4-m of the PLMN 1 and between the pCIN 42 and the pBTS 8-k. A TSB 44 coupled to the pCIN 42 of the pBSC 40 is used to provide a mobile communication subscriber for the private network with wireless communication services. The TSB 44 performs a function of matching communication data between the PBX 30 and the pBSC 40. The INIA 46 coupled to the pCIN 42 of the pBSC 40 supports local-area radio data services. The INIA 46 transmits a data packet to the LAN 90 using a PPP (Point to Point Protocol) server and a TCP (Transmission Control Protocol/Internet Protocol)/IP, wherein the data packet is received from an MS located within a public and private cell area.

A VoIP module 36 located within the PBX 30 is coupled between a switch 32 included in the PBX 30 and the LAN 90. The VoIP module 36 provides VoIP services where the IP terminal such as the LAN-phone 92 or etc. and a wired terminal (not shown) coupled to the PBX 30 are interworked by the switch 32.

The CM 50 coupled to the pBSC 40 and the LAN 90 performs a function of controlling a radio call for public and private mobile communication services. At this time, call services for the MS in the public network performs a control function so that a message can be bypassed to the MSC for the public network. The CM 50 performs a function of administrating and maintaining radio resources. However, an MSC1 2-*l* for the public network performs resource management for the pBTS 8-*k* and the CM 50 only refers to the resource management performed by the MSC1 2-*l*. The CM 50 performs a function of loading a program in a processor for controlling pBSC resources and a PLD (Program Loaded Data). However, the loading for the pBTS 8-*k* is performed by a BSM (Base Station Manager) (not shown). The CM 50 controls a wired and wireless composite function. Further, the CM 50 supports a radio SMS (Short Message Service) for the local area. Furthermore, the CM 50 supports a function of registering a subscriber in a private mobile communication network and setting functions, and performs a function of managing a VLR (Visitor Location Register) for use in roaming of the MS registered in the private mobile communication network.

In order to perform these functions, the CM 50 has software modules including a DCI (Data Communication Interface) 52, a pBTMR (PBTS Message Router) 54, a pBSC (private BSC) 56, a pMSC (private Mobile Switching Center) 58, a PMIC (PBX Mobile Interface Controller) 60, an SMC (Short Message service Controller) 62, a pVLR (private VLR) 64, a WSM (Wireless System Manager) 66 and an LIM (LAN Interface Module) 68. The DCI 52 is an interface module for supporting communication between the pCIN 42 of the pBSC 40 and the CM 50. The DCI 52 supports IPC (Inter Processor Communication) through an HINA (High speed IPC Node board Assembly). The pBTMR 54 designates a path for all messages to be processed in the pBTS 8-*k*. In more detail, the pBTMR 54 retrieves an internal router table, designates a control (signal) message path for providing the MS with incoming and outgoing call services (for the public and private networks) and designates a message path for maintenance services of the pBTS 8-*k*. Further, the pBTMR 54 communicates with the pVLR 64. The pBSC 56 as the main controller of the pBSC 40 controls the pBTS 8-*k*. When the pMSC 58 supports the public and private mobile communication services, it is located between the pBSC 56 and the PMIC 60 and performs a function similar to a function of the MSC included in a pre-existing public mobile communication network. Further, in accordance with the embodiment of the present invention, the pMSC 58 basically processes a subscriber call, analyzes other supplementary services and processes an interface with the PBX 30. In more detail, the pMSC 58 analyzes a service request from the subscriber, determines whether either service for a pre-existing public mobile communication network or service for the private mobile communication network must be provided in response to the service request, and processes a corresponding procedure based on a result of the determination. An interface with the pBSC 56 is based on a procedure in the public mobile communication network and uses an internal IPC. The PMIC 60 controls the wired and wireless composite function. The PMIC 60 is located within the public and private cell area. The PMIC 60 controls a call between MSs, e.g., the MSs 24 and 25 shown in FIG. 1, and a wired terminal coupled to the PBX 30. The pMSC 58 is different from a pre-existing MSC for the public network in that the pMSC 58 cannot directly perform a switching function. The pMSC 58 as the software module does not include a switch. Thus, when the private mobile communication services are provided, the public and private communication service apparatus 12 uses the switch 32 of the PBX 30. In accordance with the embodiment of the present invention, the PMIC 60 generates an instruction necessary for controlling the switch 32 of the PBX 30 in response to a switch control request from the pMSC 58 and transmits the instruction to a controller (not shown) included in the PBX 30. The controller of PBX 30 performs the switching function in response to the instruction. The SMC 62 controls the SMS and acts as an SMS web server. The pVLR 64 manages subscriber information registered in the private mobile communication services, location registration information of a mobile communication subscriber for the private network and other supplementary service information. The WSM 66 performs all the administration and maintenance functions of the mobile communication services provided by the public and private communication service apparatus 12. The WSM 66 is coupled to an operator console (not shown) for interface with an operator. The LIM 68 is a software module for communicating with the LAN 90. The LIM 68 uses an OS (Operating System) to perform a communication function through the PMIC 60, the SMC 62, the pVLR 64, the WSM 66 and the LAN 90.

The pBTS 8-*k* includes a PMCC (PBTS Main Controller Card) 80, a PCC (PBTS Channel Card) 82, a TRIC (Transmit & Receive Interface Card) 84 and a PRU (private BTS Radio Unit) 86. Since components included in the pBTS 8-*k* and their functions are similar to those included in the BTS of a conventional public mobile communication system and their functions, a detailed description of the pBTS 8-*k* will be omitted in this specification. The PMCC 80 performs an overall control of the pBTS 8-*k*, processes a signaling message relating to call set-up and system performance, manages hardware and software, and performs resource assignment. The PCC 82 processes base-band signals on the basis of a radio communication standard. The TRIC 84 performs transmission and reception interface between the PRU 86 and the PCC 82. The PRU 86 is an RF (Radio Frequency) module. The PRU 86 is coupled to a plurality of antennas ANT1-ANTn.

The public and private communication service apparatus 12 provides the wired services, the IP terminal services and the public and private mobile communication services. Hereinafter, a detailed description will be given of the public and private mobile communication services performed by the public and private communication service apparatus 12.

The public and private communication service apparatus 12 provides the MSs registered in the CM 50 with wired and wireless composite function services as well as wireless communication services. The wireless communication services include outgoing call transmission services, incoming call reception services, call transfer service, call forwarding services, local-area radio data services and local-area radio SMS services. The wired and wireless composite function services include a service for simultaneously informing the wired terminal and a corresponding MS of an incoming call when the communication service apparatus 12 receives the call incoming into the wired terminal.

The term public and private mobile communication system means that it can provide public and private mobile communication services. Accordingly, all the messages incoming into the communication service apparatus 12 are analyzed and a control (signal) message corresponding to the public mobile communication network is transmitted to the BSC for the public network and a control (signal) message corresponding to the private mobile communication network is routed to the modules within the CM 50. The pBTMR 54 included in the CM 50 performs a routing function. Where an outgoing call transmission event, an incoming call reception event, a location registration event or an SMS service event occurs, the pBTMR 54 analyzes a message corresponding to the event and designates a routing path associated with the message. The pBTMR 54 is equipped with a router table, which has routing information mapped to each event. The message is transmitted to a corresponding device and module using the router table.

Figure 3:
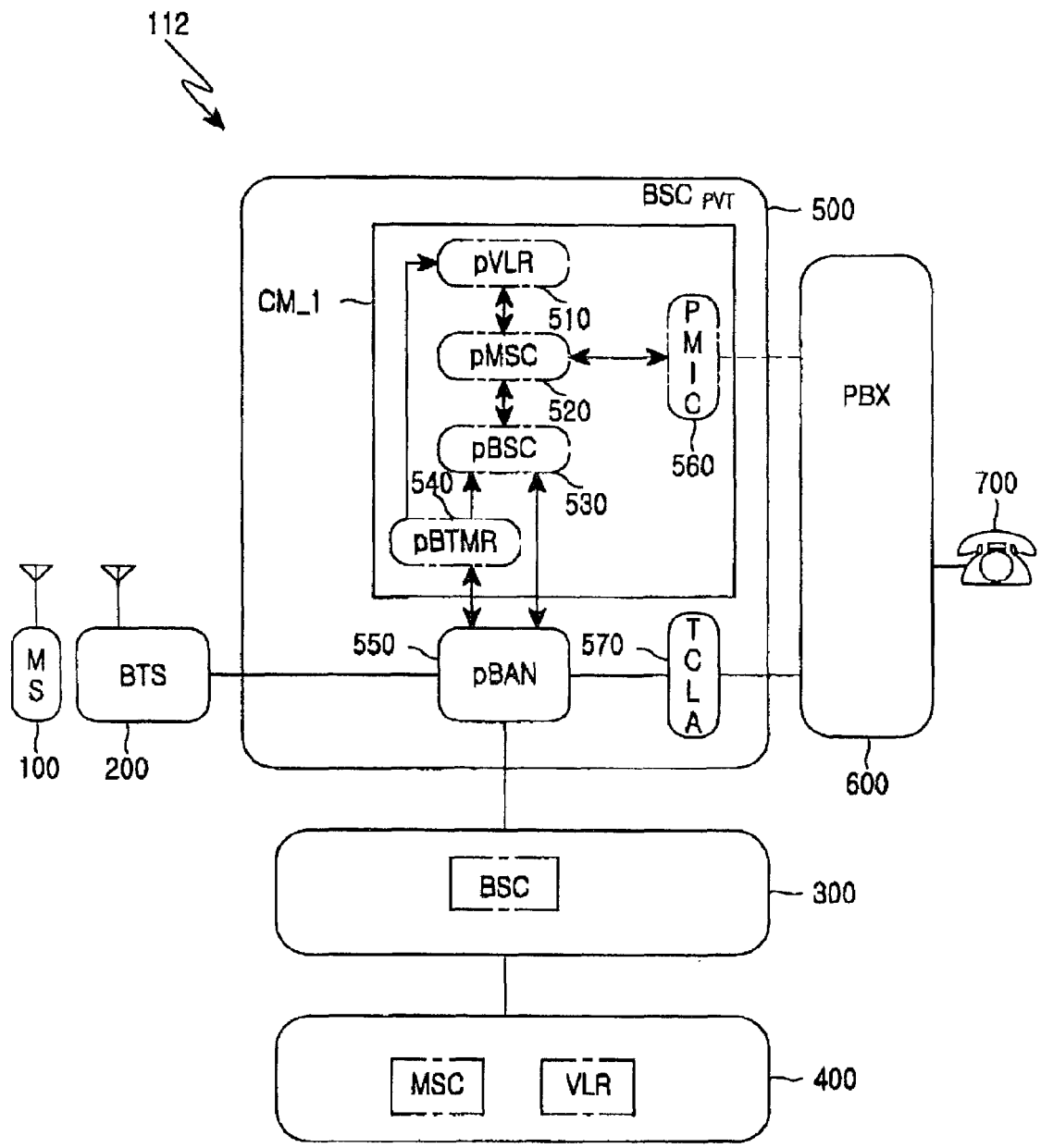
FIG. 3 is another exemplary view illustrating a configuration of a public and private communication service apparatus associated with a public and private mobile communication system in which the present invention can be applied.

FIG. 3 is another exemplary view illustrating a configuration of a public and private communication service apparatus 112 associated with a public and private mobile communication system in which the present invention can be applied.

As shown in FIG. 3, the public and private communication service apparatus is made up of a BTS 200, a $BSC_{PVT}$ 500 (where "PVT" stands for "private"), and an ATM (Asynchronous Transfer Mode) network arranged between wireless public networks 300 and 400. The public and private communication service apparatus transmits a signal packet, a voice compression packet and a data packet.

The CM 50 acts as an independent server in FIG. 2. However, a card instead of the independent server as the CM 50 is embedded in the $BSC_{PVT}$ 500 in FIG. 3. Referring to FIG. 3, the card of the CM 50 denotes "CM_1". The card CM_1 has software modules including a pVLR 510, a pMSC 520, a pBSC 530, a pBTMR 540 and a PMIC 560. The $BSC_{PVT}$ 500 includes a pBAN (private BSC ATM Network) 550, a TCLA (Transcode Control and Link Board Assembly) 570, etc. coupled to a packet message path.

An MS 100 located in a local area (private) network can receive and transmit call signals from and to the wireless public networks 300 and 400 through the BTS 200. The VLR in the wireless public network continuously updates a state of the MS 100 to a busy state or an idle state. If a call signal is transmitted to an MSC included in the wireless public network 400 from another MSC, an HLR (Home Location Register) (not shown) queries a subscriber state from the VLR. At this time, if the subscriber state is the idle state, the call signal is routed from another MSC to the MSC included in the wireless public network 400 so that paging is performed.

A description will be given of a communication path in the case where the call signal incoming into the public network is received. The MSC included in the wireless public network 400 transmits a paging request message to a BSC 300 through ITU-T (telecommunication standardization sector of the International Telecommunication Union) signaling system No. 7. In response to the paging request message, the BSC 300 transmits a general paging message to the BTS 200 through the pBSC 530. The BTS 200 receives the paging message through a paging channel. However, when an incoming call is generated, the state of the MS 100 recorded in the VLR is queried. The MSC included in the wireless public network 400 determines whether the MS 100 is in the busy state. If the MS 100 is in the busy state, the MSC 400 performs a process corresponding to the busy state.

Hereinafter, a description will be given of a communication path in the case where a local-area call is generated.

Where an incoming call is generated, the PBX 600 transmits a paging request message to the pBSC 530. In response to the paging request message, the pBSC 530 transmits a paging message to the BTS 200. In response to the paging message, the BTS 200 performs paging through the paging channel.

On the other hand, where an outgoing call is generated, the MS 100 transmits an outgoing call message to the pBSC 530 through the BTS 200. In response to the outgoing call message, the pMSC 520 occupies an available channel of E1 channels coupled between the pBSC 530 and the PBX 600. Thereafter, the pMSC 520 transmits an assignment request message to the pBSC 530. In response to the assignment request message, the pBSC 530 transmits a channel assignment message to the BTS 200. Accordingly, a link set-up is made between a vocoder (not shown) of the pBSC 530 and a channel of the BTS 200. Thereafter, the MS 100 transmits a service connection completion message to the pBSC 530. In response to the service connection completion message, the pBSC 530 informs the pMSC 520 that the link set-up has been completed through the transmission of the assignment completion message. In response to the assignment completion message, the pMSC 520 transmits a call message to the PBX 600 so that the PBX 600 can route the call message to a called party.

The paging request message is transmitted from the BSC 300 to the BTS 200 through the pBSC 530. At this time, the pBSC 530 analyzes destination information contained in the paging request message. If the destination information corresponds to a subscriber located within the local area, it is determined whether the subscriber is in a local-area call connection or busy state. If the subscriber is in the call connection or busy state, the paging request message can be rejected.

Up to now, the description of a public and private communication service apparatus associated with a public and private mobile communication system in which the present invention can be applied has been provided only for a better understanding of the present invention. Those skilled in the art will appreciate that the present invention can be applied in another system and device having components and communication paths similar to the above-described embodiments.

Hereinafter, a detailed description will be given of the present invention based on the public and private communication service apparatus shown in FIG. 2 or 3. However, the preferred embodiments of the present invention have been disclosed for illustrative purposes, they are not intended to limit the scope of the present invention. Those skilled in the art will appreciate that the present invention can be applied in another system and device having components and communication paths similar to the above-described embodiments shown in FIG. 2 or 3.

Figure 4:
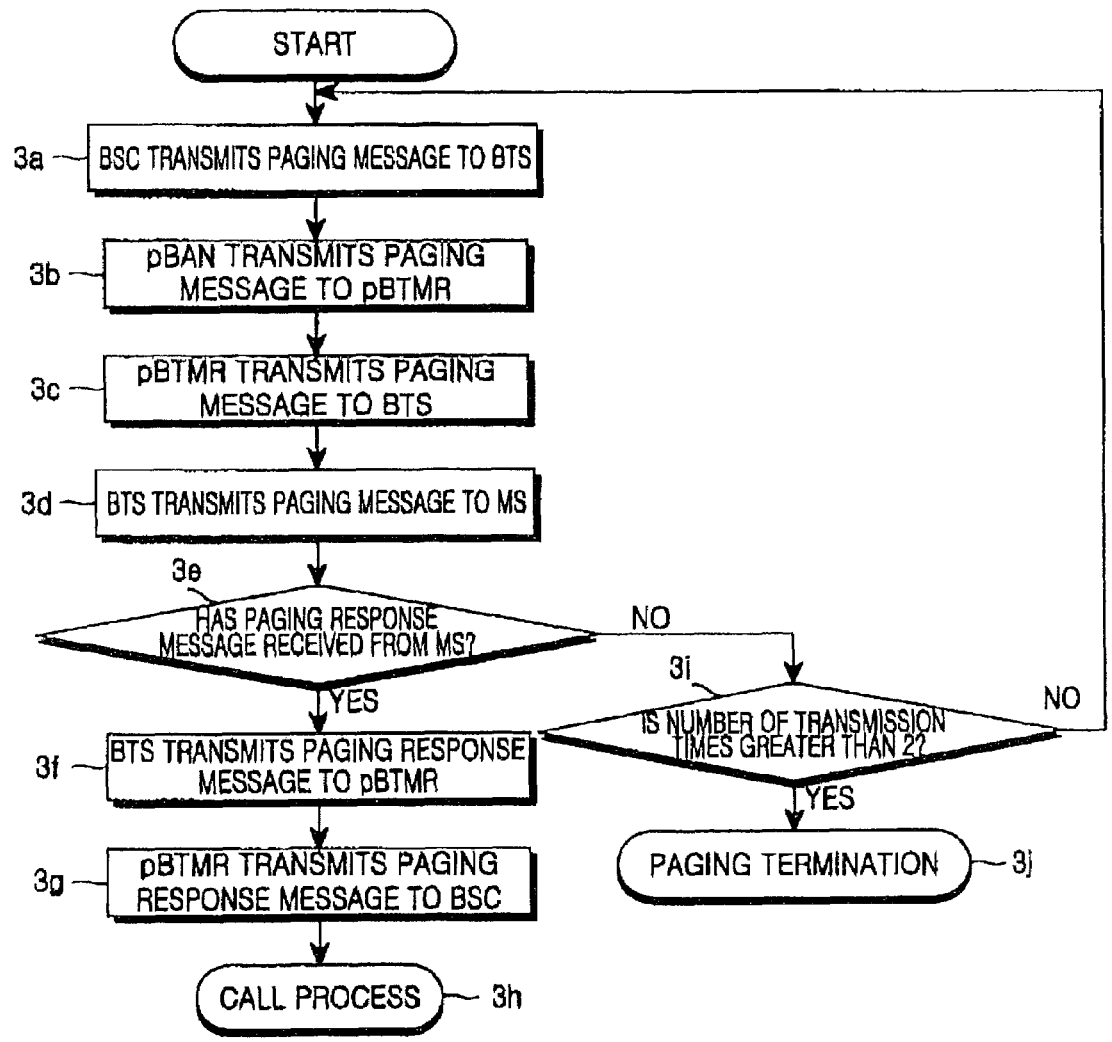
FIG. 4 is a flow chart illustrating a method for processing a paging call signal from a public network in a public and private communication service apparatus associated with a public and private mobile communication system in which the present invention can be applied.

FIG. 4 is a flow chart illustrating a method for processing a paging call signal from a public network in a public and private communication service apparatus associated with a public and private mobile communication system shown in FIG. 2 or 3. Hereinafter, the method will be described with reference to FIGS. 3 and 4.

The BSC 300 transmits a paging message to the BTS 200 in order to page the MS 100 located in a cell area for the public and private networks at step 3*a*. Then, the pBAN 550 transmits the paging message to the pBTMR 540 at step 3*b*. In FIG. 2, the paging message is transmitted to the pBTMR 540 through the pCIN 42. Returning to FIG. 3, the pBTMR 540 transmits the paging message to the BTS 200 at step 3*c*.

The BTS 200 transmits the paging message to the MS 100 at step 3*d*. It is checked at step 3*e* whether a paging response message has been received from the MS 100. If a paging response message has been received from the MS 100, it is transmitted to the pBTMR 540 through the pBAN 550 at step 3f. The pBTMR 540 transmits the paging response message to the BSC 300 for the public network through the pBAN 550 at step 3g. Then, the BSC 300 performs a call process at step 3h.

On the other hand, if a paging response message has not been received from the MS 100, it is checked whether the number of transmission times is greater than a predetermined number of transmission times, e.g., 2. If the number of re-transmission times is greater than a predetermined number of transmission times, the BSC 300 proceeds to step 3j in order to terminate paging service. Otherwise, the paging message is re-transmitted at the above step 3a.

In the case where the MS 100 has a problem or currently uses the private network, the MS 100 cannot transmit the paging response message. The latter case means that the MS 100 communicates with another subscriber terminal 700 located in the local area of the private network. Accordingly, although a paging signal (incoming call signal) is generated from the public network, the MS 100 cannot transmit any response message because of being in the busy state. At this time, because the public network recognizes that the MS 100 is in the idle state rather than the busy state, the wireless public network continuously transmits the paging signal (incoming call signal) toward the MS 100. As described above, the paging message can be transmitted twice. If the MS 100 is in the busy state while the paging message is transmitted twice, the BSC cannot help performing a non-response process because the MS 100 cannot give any response to the paging signal (incoming call signal). In this case, because the public network cannot identify the location of the MS 100 and transmits the paging signal twice, radio resources of the public network cannot be effectively managed.

Figure 5:
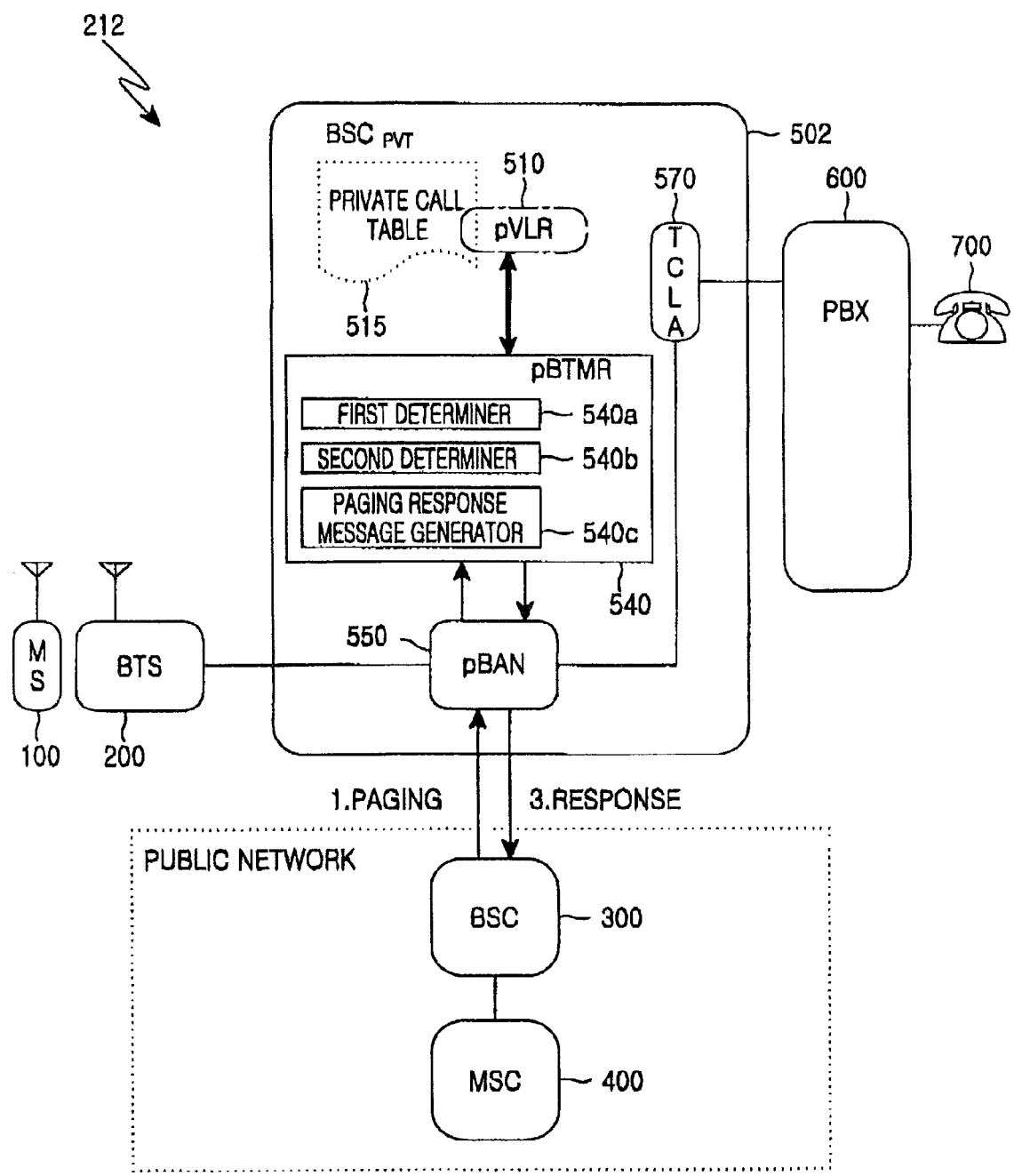
FIG. 5 is another exemplary view illustrating a configuration of a public and private communication service apparatus associated with a public and private mobile communication system in accordance with the present invention.

FIG. 5 is another exemplary view illustrating a configuration of a public and private communication service apparatus 212 associated with a public and private mobile communication system in accordance with the present invention.

An embodiment shown in FIG. 5 can be implemented in the public and private communication service apparatus shown in FIG. 3. The pMSC 520, the pBSC 530 and the PMIC 560 shown in FIG. 3 are omitted in the embodiment shown in FIG. 5.

In accordance with the embodiment of the present invention, a pBTMR 540 of the $BSC_{PVT}$ 502 of the public and private communication service apparatus includes first and second determiners 540a and 540b and a paging response message generator 540c. The first determiner 540a determines whether a call directed from the public network to the MS 100 is generated. The second determiner 540b determines whether the MS 100 is in a local-area call connection state. If a call directed from the public network to the MS 100 is generated and the MS 100 is in the local-area call connection state, the paging response message generator 540c generates a paging response message to transmit it to the public network instead of the MS 100.

The second determiner 540b can determine whether the MS 100 is connected to the private network or in the local-area call connection state, by retrieving a private call table 515 having state information of the MS 100.

A description will be given of processes of transmitting paging call signals from the public and private networks and processes of generating paging response messages in response to the paging call signals.

The process of transmitting the paging call signal from the public network is based on a path of "MSC->BSC->$BSC_{PVT}$ (pBTMR)->BTS->MS". The process of generating the paging response message is based on a path of "MS->BTS->$BSC_{PVT}$(pBTMR)->BSC->MSC". Here, the $BSC_{PVT}$ (pBTMR) represents a software module for routing a message from the BTS 200.

The process of transmitting the paging call signal from the private network is based on a path of "pMSC->$BSC_{PVT}$ (pBTMR)->BTS->MS". The process of generating the paging response message is based on a path of "MS->BTS->$BSC_{PVT}$(pBTMR)->pMSC".

Figure 6:
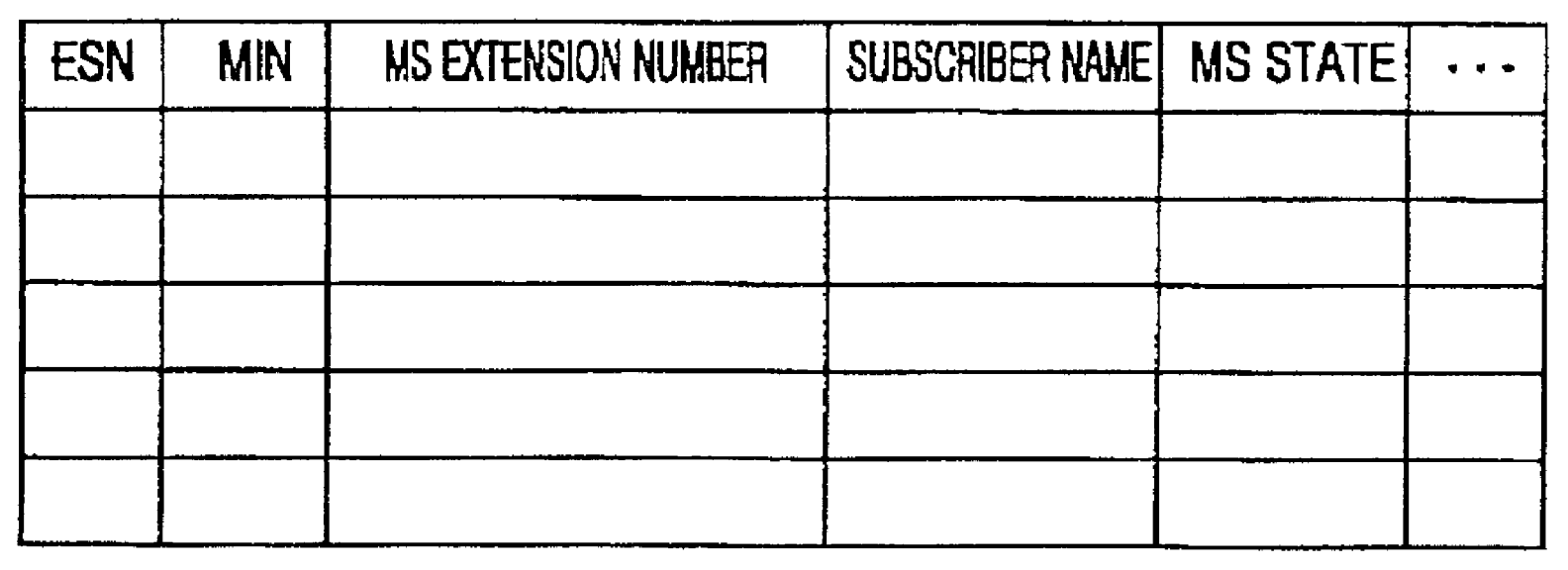

FIG. 6 is a view illustrating a structure of a table having state information of MSs included in a visitor location register for a private network in accordance with the present invention.

The private call table includes an ESN (Electronic Serial Number) of each MS, an MIN (Mobile Identification Number), an extension number, a subscriber name, state information. The state information indicates whether the MS uses the private network. The state information is recorded or deleted by the pMSC 520. When the MS receives a paging call signal from the private network, the state information indicating that the MS currently uses the private network is recorded. When the call signal is released, the recorded state information is deleted.

When the paging response message is generated in response to the paging call signal, the pBTMR 540 retrieves the state information and then routes the paging response message. Further, the pBTMR 540 retrieves the state information and performs routing in response to the paging call signal from the public network. In other words, if a corresponding terminal uses the private network, the pBTMR 540 generates the paging response message instead of the terminal and then transmits it to the public network.

FIG. 7 is a view illustrating a format of a paging response message in accordance with the present invention.

As shown in FIG. 7, a message tag "sud_tag" indicates a type of a message such as a PRM (Paging Response Message) or an RGM (Registration Message). A mobile identification "mobile_id" includes an ESN, an MIN and an IMSI (International Mobile Subscriber Identity), etc. The IMSI is stored in an SIM (Subscriber Identity Module) and used in authentication for system connection.

Figure 8:
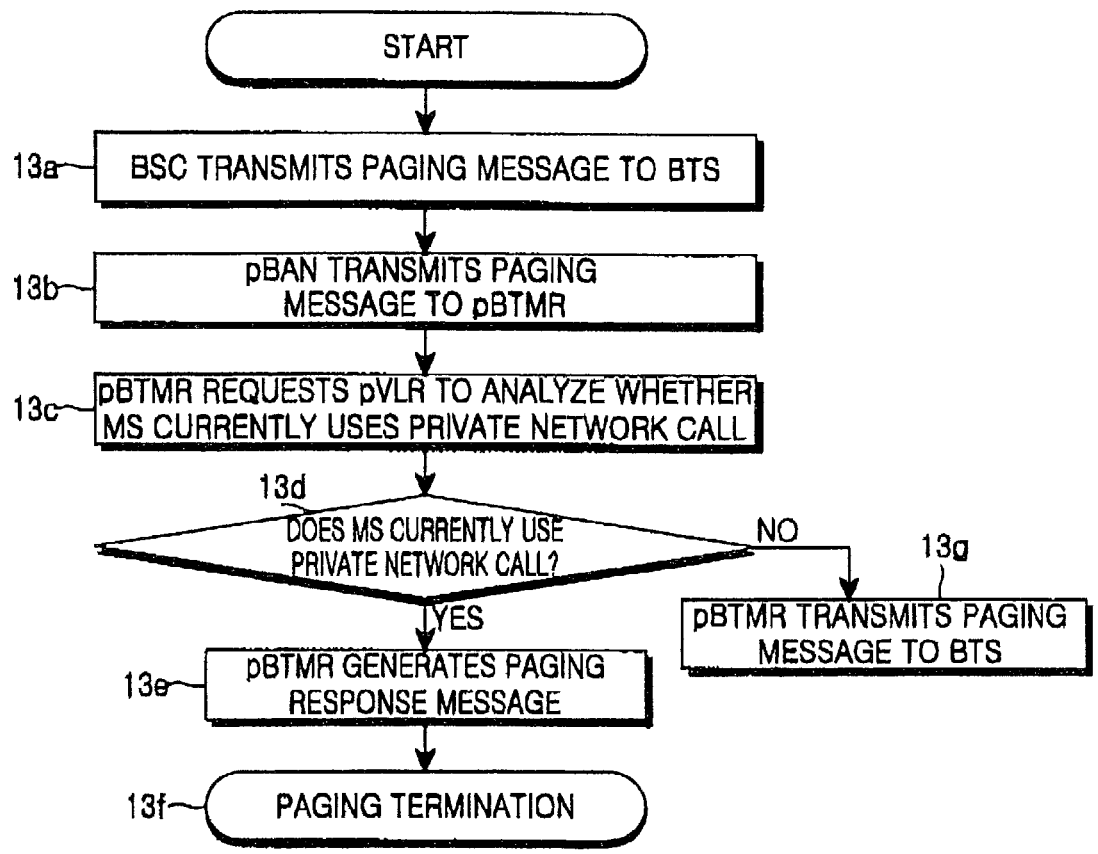
FIG. 8 is a flow chart illustrating a method for allowing a private network to process a paging call signal from a public network in accordance with the present invention.

FIG. 8 is a flow chart illustrating a method for allowing a private network to process a paging call signal from a public network in accordance with the present invention. The call process performed by the private network is made up of four stages. The method will be described with reference to FIGS. 5 and 8.

A first stage: It is determined whether the public network generates the paging call signal directed to the MS 100.

The BSC 300 transmits a paging message to the BTS 200 in order to page the MS 100 located in a public and private cell area at step 13a.

A second stage: If the public network generates the paging call signal directed to the MS 100 at the first stage, it is checked on the basis of the private call table 515 shown in FIG. 6 whether the MS 100 currently uses the private network.

The pBAN 550 transmits the paging message to the pBTMR 540 at step 13b. The pBTMR 540 requests the pVLR 510 to analyze whether the MS 100 currently uses a private network call at step 13c.

A third stage: If the MS 100 currently uses a private network call at the second stage, the pBTMR 540 generates a paging response message instead of the MS 100 as shown in FIG. 7 and then transmits it to the public network.

If the MS 100 currently uses the private network call at step 13*d*, the pBTMR 540 generates the paging response message instead of the MS 100 as shown in FIG. 7 and then transmits it to the BSC 300 of the public network through the pBAN 550 at step 13*e*. The BSC 300 terminates the paging service at step 13*f*.

A fourth stage: If the MS 100 does not currently use the private network call at the second stage, a following step is performed. In other words, if the MS 100 does not currently use the private network call at step 13*d*, the pBTMR 540 transmits the paging message to the BTS 200 through the pBAN 550 at step 3*g*.

Figure 9:
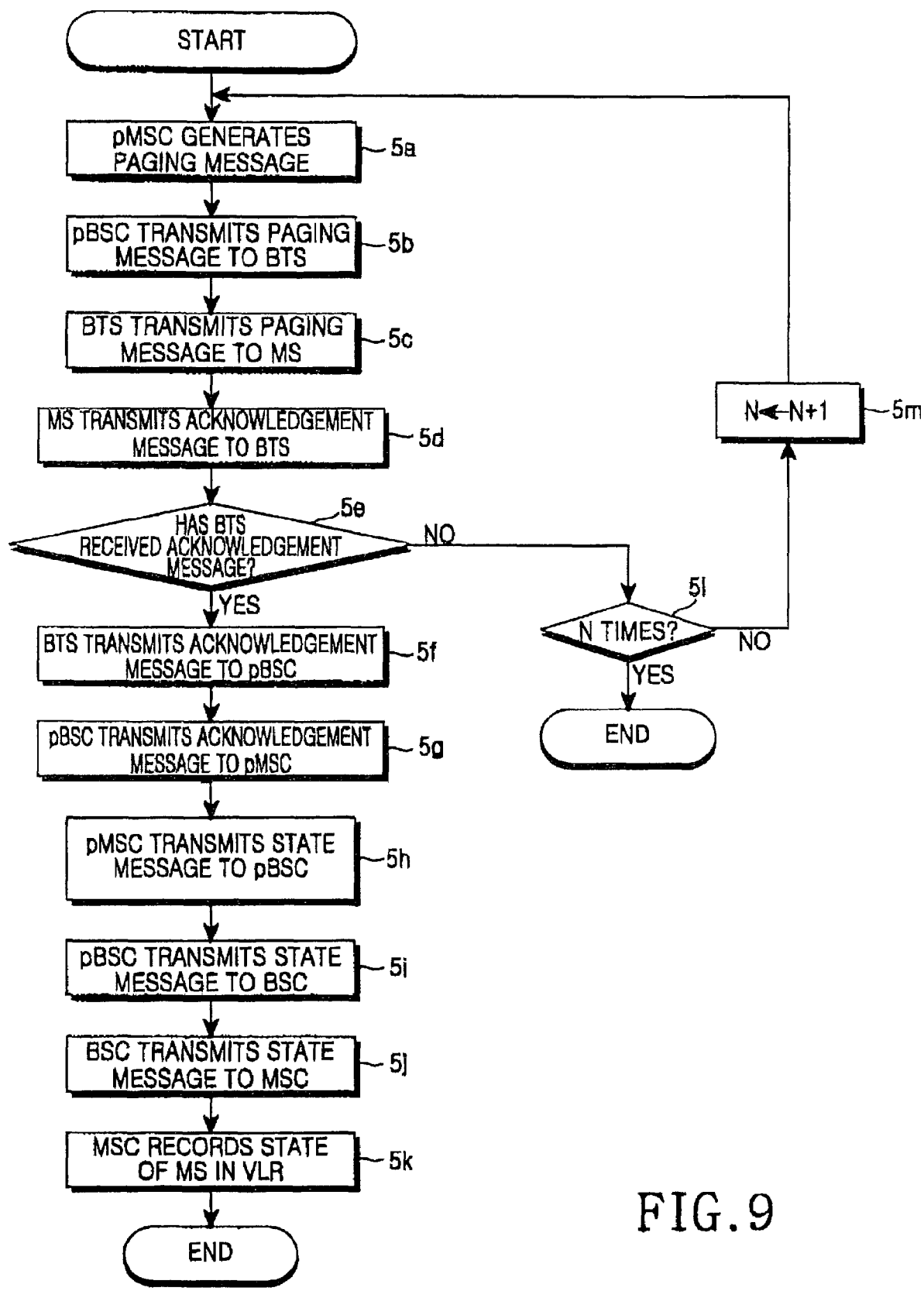
FIG. 9 is a flow chart illustrating a method for allowing a private network to transmit state information of a local-area MS located within a public and private cell area to the public network in accordance with the present invention.

FIG. 9 is a flow chart illustrating a method for allowing a private network to transmit state information of a local-area MS located within a public and private cell area to the public network in accordance with the present invention.

In FIG. 3, the process of transmitting the paging call signal from the private network is based on a path of "pMSC->BSC$_{PVT}$(pBTMR)->BTS->MS". The process of generating the paging response message is based on a path of "MS->BTS->BSC$_{PVT}$(pBTMR)->pMSC". Further, the process of transmitting the state information of the local-area MS in the private network is based on a path of "BSC$_{PVT}$(pBTMR)->BSC->MSC". The above-described processes will be described in detail with reference to FIG. 9.

It is assumed that the MS 100 is paged from another subscriber terminal 700 in the local area. The state information of the MS 100 is transmitted to the public network. This process is as follows.

A first stage: If the PBX transmits a paging request message in order to page the MS 100 located in a public and private cell area, the pMSC 520 generates a paging message at step 5*a*. The pBSC 530 transmits the paging message to the BTS 200 at step 5*b*. The BTS 200 transmits the paging message to the MS 100 at step 5*c*.

A second stage: In response to the paging message, the MS 100 generates an acknowledgement message and then transmits it to the BTS 200 at step 5*d*.

A third stage: The BTS 200 transmits the acknowledgement message to the pBSC 530 through the pBAN 550 at steps 5*e* and 5*f*. The pBSC 530 transmits the acknowledgement message to the pMSC 520 at step 5*g*. The pMSC 520 forms a communication path in response to the acknowledgement message and then transmits a state message indicating a state (e.g., busy state) of the MS 100 to the pBSC 530 at step 5*h*. The pBSC 530 transmits the state message to the BSC 300 for the public network through the pBAN 550 at step 5*i*. The BSC 300 transmits the state message to the MSC 400 at step 5*j*. The MSC 400 records the state (e.g., busy state) of the MS 100 in the VLR in response to the state message at step 5*k*.

A fourth stage: If the acknowledgement message has not been received at the third stage, a step relating to non-response is performed. In other words, if the pMSC 520 has not received the acknowledgement message at step 5*e*, the paging message is re-transmitted the predetermined number of times (or for a predetermined period of time) on the basis of steps 5*l* and 5*m*.

Figure 10:
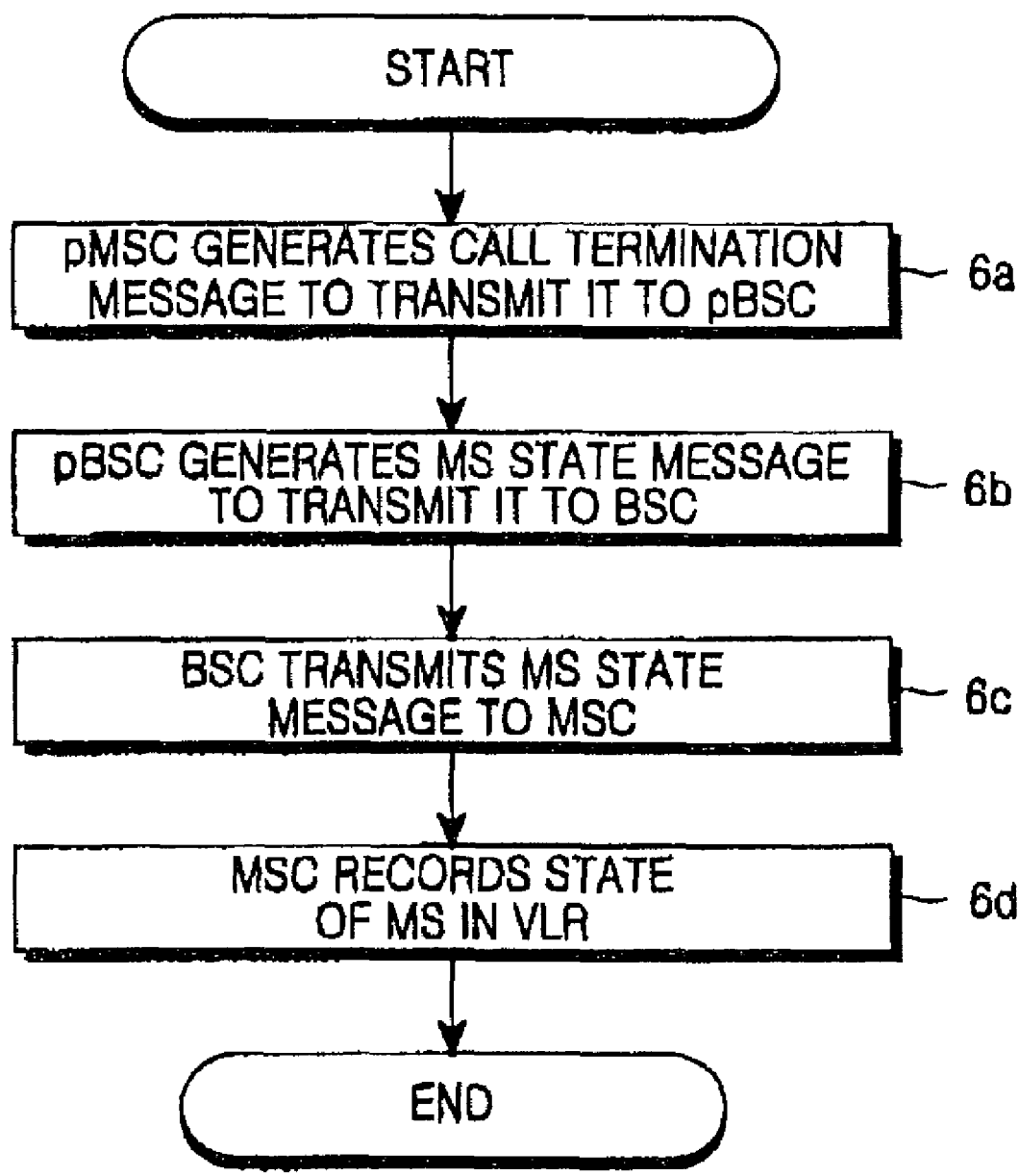
FIG. 10 is a flow chart illustrating a method for transmitting an MS state message to an MSC (Mobile Switching Center) when the private network terminates an MS call in accordance with the present invention.

FIG. 10 is a flow chart illustrating a method for transmitting an MS state message to an MSC when the private network terminates an MS call in accordance with the present invention.

A first stage: The pMSC 520 generates a call termination message relating to the MS 100 located in a public and private cell area at step 6*a*.

A second stage: In response to the call termination message, the pBSC 530 generates an MS state (e.g., idle state) message and then transmits it to the BSC 300 for the public network through the pBAN 550 at step 6*b*.

A third stage: The BSC 300 transmits the MS state message to the MSC 400 at step 6*c* and then the MSC 400 records the state (e.g., idle state) of the MS 100 in the VLR in response to the MS state message at step 6*d*.

Figure 11:
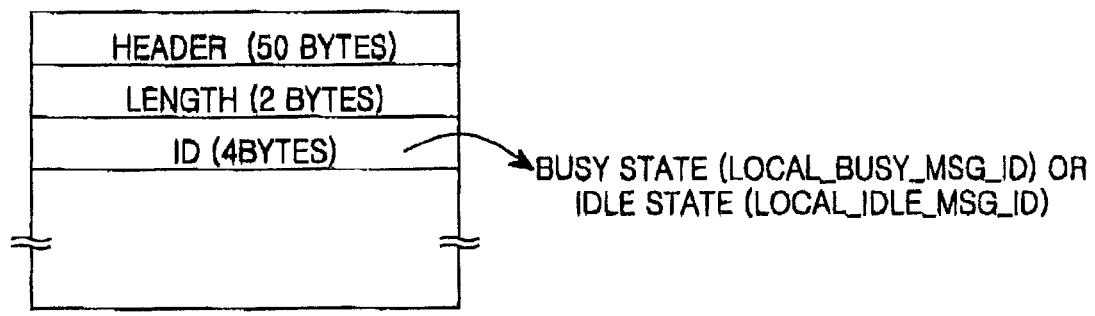
FIG. 11 is a view illustrating a format of a new message, which is made for matching subscriber states, in accordance with the present invention.

FIG. 11 is a view illustrating a format of a new message, which is made for matching subscriber states, in accordance with the present invention.

The new message includes message fields. The message fields basically contain a 50-byte message header field, a 2-byte message length field and a 4-byte message ID (identification) field. Destination and source addresses are recorded in the message header field. A length of a message is recorded in the message length field. A type of a message is recorded in the message ID field.

The busy state "LOCAL_BUSY_MSG_TYPE" or the idle state "LOCAL_IDLE_MSG_TYPE" can be recorded in the message ID field so that the message is used for matching the subscriber states.

Figure 12:
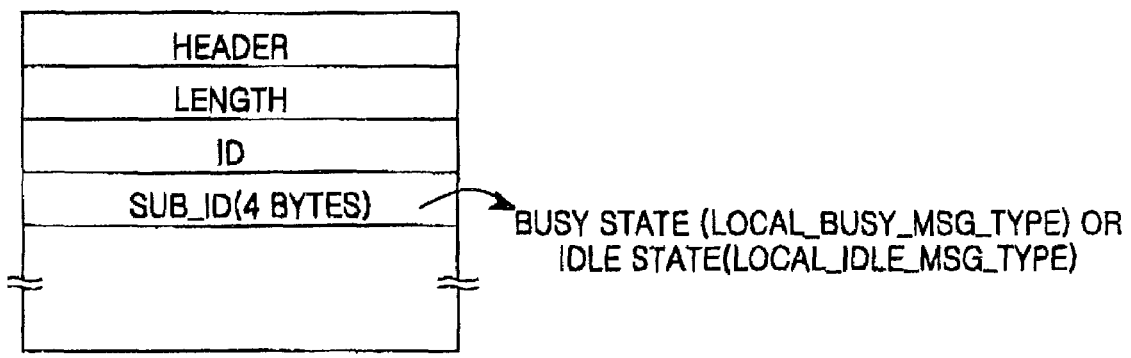
FIG. 12 is a view illustrating a message in which sub-ID and sub-type data are added to a pre-existing message for matching subscriber states in accordance with the present invention.

FIG. 12 is a view illustrating a message in which sub-ID and sub-type data are added to a pre-existing message for matching subscriber states in accordance with the present invention.

As compared with the message shown in FIG. 11, the message shown in FIG. 12 further includes a message sub-ID field. The message sub-ID field is of 4 bytes. The sub-type of the message is recorded in the message sub-ID field.

The busy state "LOCAL_BUSY_MSG_TYPE" or the idle state "LOCAL_IDLE_MSG_TYPE" can be recorded in the message sub-ID field so that the message is used for matching the subscriber states.

Figure 13:
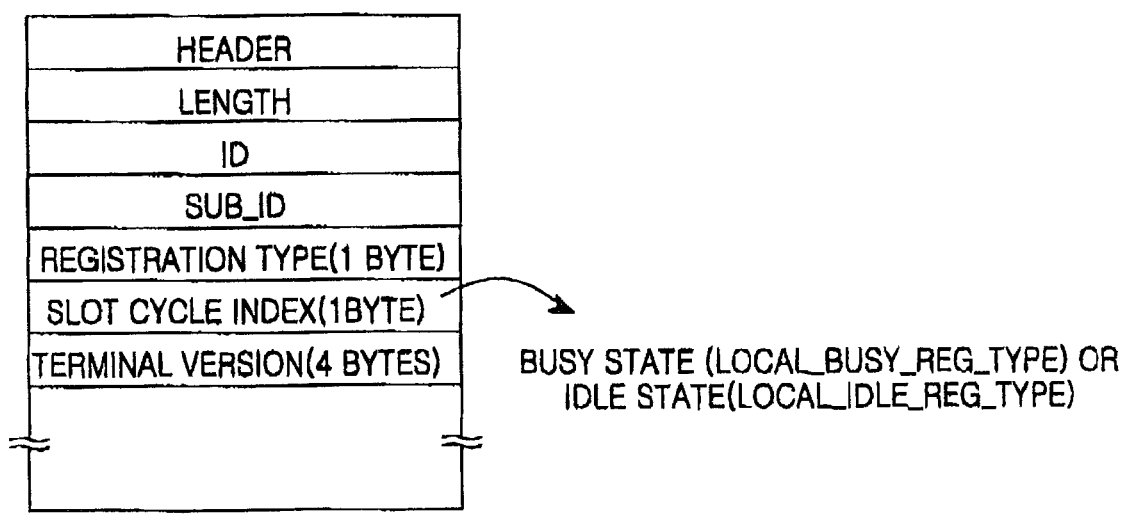
FIG. 13 is a view illustrating a message in which sub-ID and sub-type data are added to a location registration message for matching subscriber states in accordance with the present invention.

FIG. 13 is a view illustrating a message in which sub-ID and sub-type data are added to a location registration message for matching subscriber states in accordance with the present invention.

As compared with messages shown in FIGS. 11 and 12, the location registration message shown in FIG. 13 further includes a 1-byte registration type field, a 1-byte slot cycle index field and a terminal version field.

The busy state "LOCAL_BUSY_MSG_TYPE" or the idle state "LOCAL_IDLE_MSG_TYPE" can be recorded in the registration type field so that the location registration message is used for matching the subscriber states. Further, a slot cycle index is provided for indicating a cycle so that the terminal can search a paging channel message for the cycle. For example, a slot cycle index "0" indicates a cycle of 1.28 seconds. A slot cycle index "1" indicates a cycle of 2.56 seconds. A slot cycle index "2" indicates a cycle of 5.12 seconds. Terminal versions "1", "2" and "3" are IS-95, IS-95-A (Telecommunication Industry Association (TIA)/Electronic Industry Alliance (EIA) IS-95 and IS-95A) and TSB 44, respectively.

As apparent from the above description, the present invention provides an apparatus, method and system, which can allow a public network to recognize state information of a private network subscriber located in a private and public cell area by transmitting terminal state information from the private network to the public network in a mobile communication system interworked with the public and private networks. Accordingly, public and private mobile communication services can be quickly and smoothly provided. Further, the present invention can efficiently manage radio resources by removing unnecessary paging, e.g., transmission of a second paging call signal, or an error process based on a paging non-response.

Although the preferred embodiments of the present invention have been disclosed for illustrative purposes, they are not intended to limit the scope of the present invention. Those skilled in the art will appreciate that various modifications, additions and substitutions are possible, without departing from the scope of the invention. Therefore, the present invention is not limited to the above-described embodiments, but the present invention is defined by the claims which follow, along with their full scope of equivalents.

What is claimed is:

1. A method, comprising: in a public and private mobile communication system interworked with a public land mobile network including one or more mobile switching centers, a plurality of public-network base station controllers coupled to each mobile switching center, and a plurality of public-network base station transceiver subsystems forming a public cell area and being coupled to each base station controller, the public and private mobile communication system including a public and private communication service apparatus coupled to one of the base station controllers, and one or more private base station transceiver subsystems forming a public and private cell area and being coupled to the public and private communication service apparatus, matching subscriber state information of the public land mobile network and subscriber state information of a wired/wireless private network in the public and private mobile communication system interworked with the public land mobile network, by:

when state information of a terminal located in the public and private cell area is changed, generating by the public and private communication service apparatus a message including a field in which the changed state information of the terminal is recorded and transmitting the message to the public-network base station controller, with the state information of the terminal indicating whether the terminal is in busy state or in idle state; and the public-network base station controller receiving and reading the field indicating the state information of the terminal included in the message and update state information of the terminal located in a visitor location register on the public side.

2. The method as set forth in claim 1, wherein the field includes a 4-byte message identification field.

3. The method as set forth in claim 1, wherein the field includes a 4-byte message sub-identification field.

4. The method as set forth in claim 1, wherein the message includes a location registration message and the field includes a 1-byte registration type field.

5. A method, comprising:

in a public and private mobile communication system interworked with a public land mobile network including one or more mobile switching centers, a plurality of public-network base station controllers coupled to each mobile switching center, and a plurality of public-network base station transceiver subsystems forming a public cell area and being coupled to each base station controller, the public and private mobile communication system including a public and private communication service apparatus coupled to one of the base station controllers, and at least one private base station transceiver subsystems forming a public and private cell area and being coupled to the public and private communication service apparatus, matching subscriber state information of a public land mobile network and subscriber state information of a wired/wireless private network in a public and private mobile communication system interworked with the public land mobile network, by:

a when a terminal located in the public and private cell area gives a response to a paging signal from the private network, allowing the public and private communication service apparatus to generate a message including a field in which state information of the terminal is recorded and transmitting the message to the public-network base station controller, the state information of the terminal indicating a busy state; and the public-network base station controller receiving and reading the field indicating the state information of the terminal included in the message and update state information of the terminal located in a visitor location register on the public side.

6. The method as set forth in claim 5, further comprising the steps of:

when a call between the terminal and the private network is terminated, allowing the public and private communication service apparatus to generate a message including a field in which state information of the terminal is recorded and transmitting the message to the base station controller, the state information of the terminal indicating an idle state; and allowing the base station controller to receive and read the field indicating the state information of the terminal included in the message and update state information of the terminal located in the visitor location register.

7. The method as set forth in claim 6, wherein the field includes a 4-byte message identification field.

8. The method as set forth in claim 6, wherein the field includes a 4-byte message sub-identification field.

9. The method as set forth in claim 6, wherein the message includes a location registration message and the field includes a 1-byte registration type field.

10. The method as set forth in claim 5, wherein the field includes a 4-byte message identification field.

11. The method as set forth in claim 5, wherein the field includes a 4-byte message sub-identification field.

12. The method as set forth in claim 5, wherein the message includes a location registration message and the field includes a 1-byte registration type field.

13. A public and private communication service apparatus, the public private communication service apparatus being interworked with a public land mobile network including a plurality of mobile stations, at least one mobile switching center, a plurality of public-network base station controllers coupled to each mobile switching center, and a plurality of public-network base station transceiver subsystems forming a public cell area and being coupled to each base station controller, the public and private communication service apparatus being coupled to one or more private base station transceiver subsystems forming a public and private cell area, with the public and private communication service apparatus comprising:

a network connection controller for matching subscriber state information of the public land mobile network and subscriber state information of a wired/wireless private network in the public and private mobile communication system interworked with the public land mobile network by providing a network connection for private call services and generating a message including a field in which state information of a mobile station is recorded when a private call service request message has been received from the mobile station located in the public and private cell area and transmitting the message to the base station controller, the state information of the mobile station indicating that the mobile station is coupled to a private call; and a communication path former for forming a communication path corresponding to services requested in the received message in response to a control of the network connection controller.

14. The public and private communication service apparatus as set forth in claim 13, wherein the network connection controller generates a message including a field in which state information of the mobile station is recorded when the private call services provided to the mobile station are terminated and transmits the message to the base station controller, the state information of the mobile station indicating an idle state.

15. The public and private communication service apparatus as set forth in claim 14, wherein the network connection controller comprises:

a main controller for performing an operation of controlling a private base station transceiver subsystem for public and private mobile communication services and an operation of controlling the network connection on the basis of the public and private mobile communication services;

a private location register for communicating with the main controller and recording information including subscriber state information registered for the private mobile communication services;

a routing table being used to retrieve the state information, the routing table having path information mapped to each received message; and a message router for retrieving the routing table to designate a path of the received message, generating a message including a field in which changed state information of the mobile station is recorded when subscriber state information of the private location register is changed, and transmitting the message to the base station controller.

16. The public and private communication service apparatus as set forth in claim 15, wherein the field includes a 4-byte message sub-identification field.

17. The public and private communication service apparatus as set forth in claim 15, wherein the field includes a 4-byte message identification field.

18. The public and private communication service apparatus as set forth in claim 15, wherein the message includes a location registration message and the field includes a 1-byte registration type field.

19. The public and private communication service apparatus as set forth in claim 14, wherein the message includes a location registration message and the field includes a 1-byte registration type field.

20. The public and private communication service apparatus as set forth in claim 14, wherein the field includes a 4-byte message sub-identification field.

21. The public and private communication service apparatus as set forth in claim 14, wherein the field includes a 4-byte message identification field.

22. The public and private communication service apparatus as set forth in claim 13, wherein the network connection controller comprises:

a main controller for performing an operation of controlling a private base station transceiver subsystem for public and private mobile communication services and an operation of controlling the network connection on the basis of the public and private mobile communication services;

a private location register for communicating with the main controller and recording information including subscriber state information registered for the private mobile communication services;

a routing table being used to retrieve the state information, the routing table having path information mapped to each received message; and a message router for retrieving the routing table to designate a path of the received message, generating a message including a field in which changed state information of the mobile station is recorded when subscriber state information of the private location register is changed, and transmitting the message to the base station controller.

23. The public and private communication service apparatus as set forth in claim 22, wherein the field includes a 4-byte message identification field.

24. The public and private communication service apparatus as set forth in claim 22, wherein the field includes a 4-byte message sub-identification field.

25. The public and private communication service apparatus as set forth in claim 22, wherein the message includes a location registration message and the field includes a 1-byte registration type field.

26. The public and private communication service apparatus as set forth in claim 13, wherein the field includes a 4-byte message identification field.

27. The public and private communication service apparatus as set forth in claim 13, wherein the field includes a 4-byte message sub-identification field.

28. The public and private communication service apparatus as set forth in claim 13, wherein the message includes a location registration message and the field includes a 1-byte registration type field.

* * * * *